Figure 3:
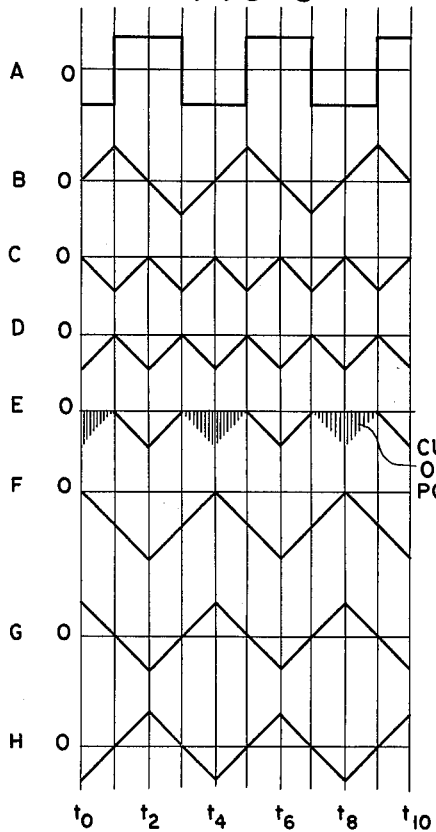

June 7, 1966 R. STELLA 3,255,416
ELECTRIC WAVE GENERATING AND PHASE SHIFTING MEANS
Filed July 5, 1963 2 Sheets-Sheet 1
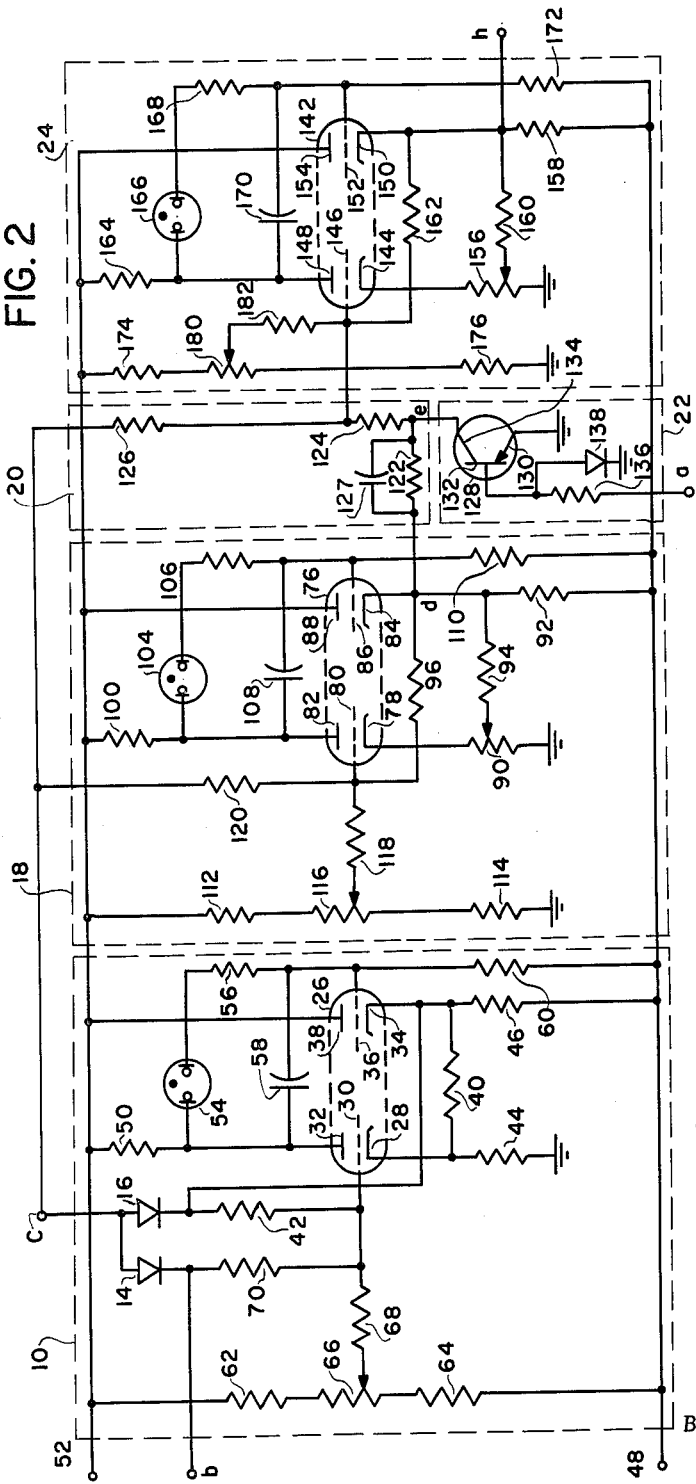
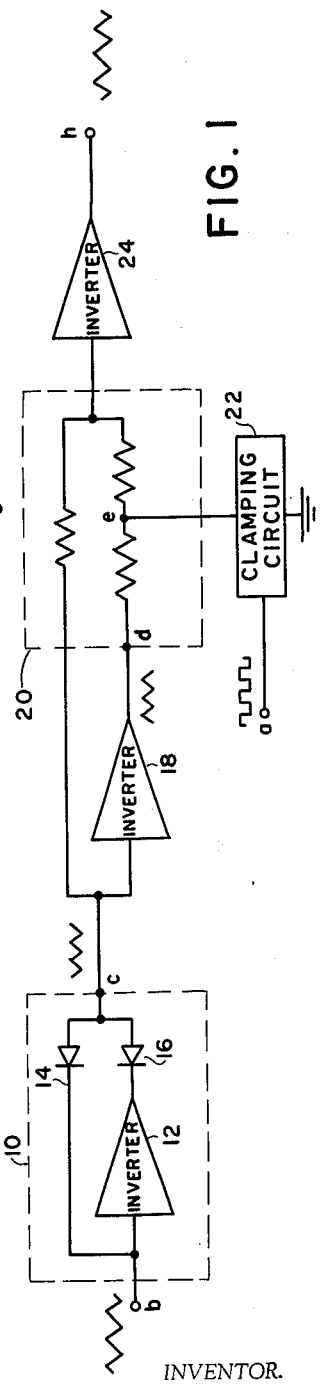
INVENTOR.
REMO STELLA
BY Hopgood & Calimafde
ATTORNEYS June 7, 1966 R. STELLA 3,255,416
ELECTRIC WAVE GENERATING AND PHASE SHIFTING MEANS
Filed July 5, 1963 2 Sheets-Sheet 2

INVENTOR.
REMO STELLA
BY Hoppgood & Calimafde
ATTORNEYS

United States Patent Office 3,255,416
Patented June 7, 1966

3,255,416
ELECTRIC WAVE GENERATING AND PHASE SHIFTING MEANS
Remo Stella, Syosset, N.Y., assignor to Servo Corporation of America, Hicksville, N.Y., a corporation of New York
Filed July 5, 1963, Ser. No. 293,012
9 Claims. (Cl. 328—22)

This invention relates to the generation of electric signals or waves and more particularly to means for providing a wave having a predetermined phase displacement with respect to a similar wave from which it is derived.

In certain types of electronic devices such as for example instruments for analyzing and testing servo mechanisms, it is necessary to provide two sine waves 90° out of phase with one another. Additionally these waves must be variable in frequency from a relatively low frequency of the order of less than 0.01 cycle per second to approximately 1000 cycles per second.

In prior electronic devices of the type referred to above the first of these sine waves is developed by first generating a triangular wave which is converted into a sine wave. The second of the sine waves is then developed from the first sine wave by using an integrator to provide a 90° phase shift with respect to the first wave. However, the gain of this integrator is inversely proportional to the frequency of its operation, and this presents a problem since a constant level output signal is required. Accordingly, some means is required for leveling the output signal and this is achieved by employing a potentiometer which is mechanically ganged to the frequency control adjustment to compensate for the loss of the gain in the integrator at the higher frequencies. In addition to this it has been found that other ganged control arrangements are also necessary in these prior art analyzing and testing instruments and, of course, all of these arrangements are undesirable as they involve further manufacturing and servicing costs and must be very carefully designed and adjusted so that proper operation is achieved.

Additionally, the nature of the circuit which is employed to produce the second sine wave is subject to considerable drift and accordingly separate drift compensation means are necessary. Furthermore, the amount of drift control is directly related to cost and circuit complexity, the arrangements which are reasonable in cost being incapable of producing the desired degree of drift control. It will be appreciated, therefore, that these prior art analyzing and testing instruments are subject to a number of important disadvantages.

Accordingly, it is an object of this invention to eliminate at least some of the major drawbacks in the devices of the prior art referred to above.

It is a further object of the invention to provide an electrical wave having a predetermined phase displacement with respect to a similar wave from which it is derived.

A further object of this invention is to provide a circuit suitable for use with the analyzing and testing instruments referred to which eliminate the need for the ganged arrangements heretofore required.

It is a further object of the invention to provide a second triangular wave which is in phase quadrature with a triangular wave from which it is derived, these triangular waves being capable of conversion to sine waves in accordance with known techniques.

A further object of the invention is to provide a circuit which is simpler and therefore more reliable than the prior art circuits referred to above.

Yet another object is to provide a circuit for developing two waves in phase quadrature with one another which has negligible drift and which is also capable of providing a precise 90° relationship between the two waves.

In accordance with one aspect of the invention, a circuit is provided for receiving and rectifying an input wave. This rectified wave is next inverted and then combined in a suitable summing network with the rectified wave. Means coupled to the summing network are also provided to modify the inverted wave by removing predetermined portions thereof as it is being combined, whereby an output wave is provided having a predetermined phase relationship with the input wave and having a shape similar thereto.

In accordance with another aspect of the invention a circuit is provided which comprises a first channel and a second channel. Each channel includes means for receiving and rectifying an input wave, the rectified waves in the two channels being in phase opposition with one another. Each channel further includes means for summing or combining the rectified waves. Means are also provided in each channel for removing predetermined portions of the rectified waves as they are being combined, whereby an output wave is provided which has a shape similar to the input wave and which has a predetermined phase relationship with the input wave.

Figure 6:
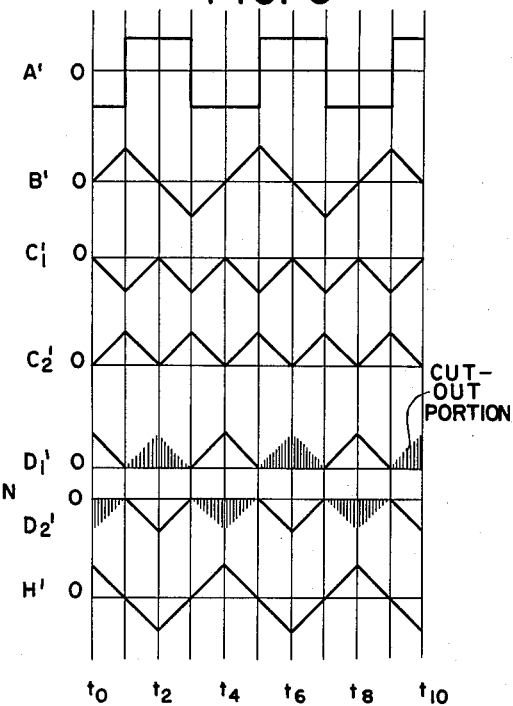
Figure 5:
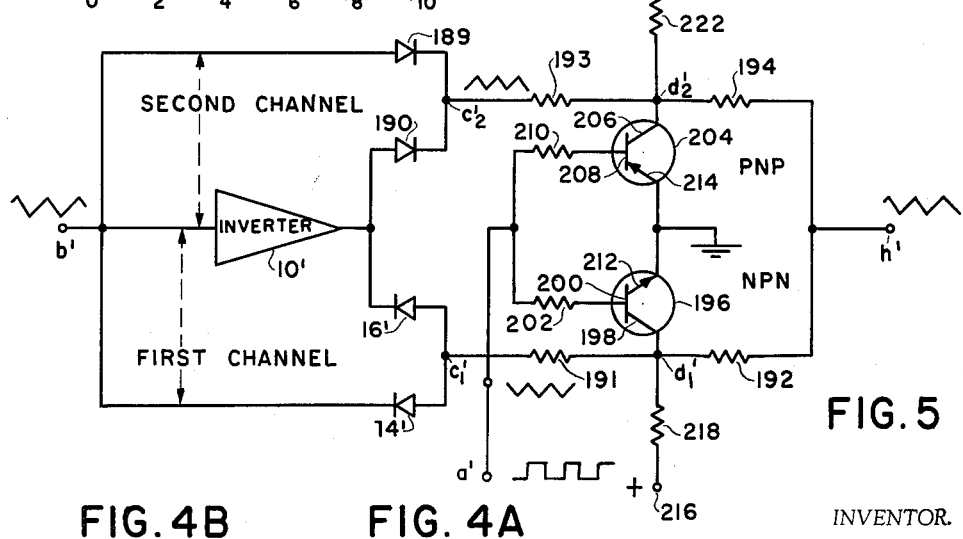

All of the objects, features and advantages of this invention and the manner of attaining them will become more apparent and the invention itself will be best understood by reference to the following description of an embodiment of the invention taken in conjunction with the accompanying drawings, in which FIG. 1 illustrates one embodiment of the invention, partly in block form, FIG. 2 is a schematic wiring diagram of the embodiment of FIG. 1, FIG. 3 shows a number of waveforms existing at various points in the diagrams of FIGS. 1 and 2, FIGS. 4A and 4B illustrate portions of the output wave of FIG. 3 under certain conditions of operation, FIG. 5 shows a further embodiment of the invention, being partly in block form and partly in the form of a schematic wiring diagram, and FIG. 6 shows a number of waveforms existing at various points in the diagram of FIG. 5.

Referring now to FIG. 1 there is shown a circuit of the invention partly in block form to which is fed a rectangular wave at a terminal $a$ and an input triangular wave at a terminal $b$, and from which is derived an output triangular wave at a terminal $h$. This circuit includes a full wave rectifier circuit 10 including an inverter 12 and rectifying diodes 14 and 16. The rectified wave from the rectifier circuit 10 appears at the point $c$ and is fed to an inverter 18 and becomes an inverted rectified wave at the point $d$. This inverted rectified wave is then fed to a summing circuit 20 in which it is modified at the point $e$ by a gating or clamping circuit 22 connected to the summing circuit 20. The clamping circuit 22 is adapted to receive a rectangular wave from the terminal $a$ and is responsive thereto. The modified wave at the point $e$ is combined in the summing circuit 20 with the rectified wave from the point $c$ and fed to an inverter 24. This inverter 24 delivers a triangular output wave which is 90° out of phase with the input triangular wave applied to the input terminal $b$.

Referring now to FIG. 2, the inverter 12 may be a D.C. amplifier type circuit including a tube 26 having two triode sections, the first of which is coupled to the input terminal $b$. The first section comprises a cathode 28, a control grid 30 and a plate 32, and the second section comprises a cathode 34, a control grid 36 and a plate 38. A positive feedback resistor 40 is connected between the two cathodes 28 and 34, and a negative feedback resistor 42 is connected between the control grid 30 and the cathode 34. A cathode resistor 44 is connected between the cathode 28 and ground and a cathode resistor 46 is connected between the cathode 34 and a negative potential terminal 48. A plate load resistor 50 is connected between the plate 32 and a positive potential terminal 52. The plate 38 is also connected to the positive potential terminal 52. The potential terminals 48 and 52 are connected respectively to the negative and positive potentials of a suitable power supply, not shown, to supply operating potential to the circuit, the chassis ground being connected to a suitable intermediate potential on the power supply. A neon bulb 54 and a resistor 56 are connected in series between the plate 32 and the control grid 36 in parallel with a capacitor 58. A resistor 60 is connected between the control grid 36 and the negative potential terminal 48.

A voltage dividing network comprising fixed resistors 62 and 64 are connected in series with a potentiometer 66 between the positive potential terminal 52 and the negative potential terminal 48. The potentiometer 66 is connected to the control grid 30 through a resistor 68 and serves to control the D.C. operating level of the inverter tube 26.

Still referring to FIG. 2, the input triangular wave B, see FIG. 3, exists at the terminal $b$ and is fed through a resistor 70 to the input control grid 30 of the inverter tube 26. The output wave from this tube 26 exists at the cathode 34 and is applied to the rectifier diode 16 which is connected between the cade 34 and the point $c$. The rectifier diode 14 is connected between the input terminal $b$ and the point $c$. The point $c$ is the output point of the full wave rectifier circuit 10.

The output from the full wave rectifier circuit 10 is fed to the inverter 18 of FIGS. 1 and 2, which is similar to the inverter 12. Thus the inverter 18 also includes a tube 76 having two triode sections. The first section comprises a cathode 78, a control grid 80 and a plate 82, and the second section comprises a cathode 84, a control grid 86 and a plate 88. A potentiometer 90 is connected between the cathode 78 and ground and a cathode resistor 92 is connected between the cathode 84 and the negative potential terminal 48. The potentiometer 90 serves as a slope matching control, as will appear. A positive feedback resistor 94 is connected between the slider of the potentiometer 90 and the cathode 84, and a negative feedback resistor 96 is connected between the control grid 80 and the cathode 84. A plate load resistor 100 is connected between the plate 82 and the positive potential terminals 52. The plate 88 is also connected to the positive potential terminal 52. A neon bulb 104 and a resistor 106 are connected in series between the plate 82 and the control grid 86 in parallel with a capacitor 108. A resistor 110 is connected between the control grid 86 and the negative potential terminal 48.

A voltage dividing network comprising fixed resistors 112 and 114 are connected in series with a potentiometer 116 between the positive potential terminal 52 and the negative potential terminal 48. The potentiometer 116 is connected to the control grid 80 through a resistor 118. This potentiometer 116 controls the D.C. operating level of the inverter 18 and may be employed as a waveform matching control, as will appear. A resistor 120 is connected between the point $c$ and the input control grid 80 of the tube 76. The output signal or wave from the tube 76 is available at the point $d$ from which it is fed to the summing network designated by the numeral 20 of FIGS. 1 and 2.

The summing network 20 includes resistors 122, 124 and 126 in series for summing or combining the signals or waves from the rectifier circuit 10 at the point $c$ with the output from the inverter 18 at the point $d$. A capacitor 127 is provided across the resistor 122 to improve the performance of the circuit at the higher frequencies of operation.

The clamping circuit 22 of FIG. 1 includes in FIG. 2 a transistor 128 having an emitter 130, a base 132, and a collector 134 and is shown as a PNP type but may also be of the NPN type with certain circuit modifications as will be known to those skilled in the art. The base 132 of the transistor 128 is connected through a resistor 136 to the terminal $a$ for receiving the rectangular or square wave signal A, see FIG. 3. A diode 138 is also connected between the base 132 and ground. This diode 78 serves to protect the transistor against back biassing by signal overloads and also prevents signal transients in the collector circuit of the transistor 128. The collector 134 is connected to the junction point $e$ between the resistors 122 and 124 of the summing circuit 20.

The output of the summing circuit 20 exists at the junction of the summing circuit resistor 124 and 126 and is fed to the input of the inverter 24 which is similar to the inverters 12 and 18. Thus the inverter 24 also includes a tube 142 having two triode sections. The first section comprises a cathode 144, a control grid 146 and a plate 148, and the second section comprises a cathode 150, a control grid 152 and a plate 154. A potentiometer 156 is connected between the cathode 144 and ground and a cathode resistor 158 is connected between the cathode 150 and the negative potential terminal 48. A positive feedback resistor 160 is connected between the slider of the potentiometer 156 and the cathode 150. A plate resistor 164 is connected between the plate 148 and the positive potential terminal 52. The plate 154 is also connected to the positive potential terminal 52. A neon bulb 166 and a resistor 168 are connected in series between the plate 148 and the control grid 152 in parallel with a capacitor 170. A resistor 172 is connected between the control grid 152 and the negative potential terminal 48.

A voltage dividing network comprising fixed resistors 174 and 176 are connected in series with a potentiometer 180 between the positive potential terminal 52 and the negative potential terminal 48. The potentiometer 180 is connected to the control grid 146 through a resistor 182 and serves to control the D.C. operating level of the inverter 24. The output waves from this last inverter 24 comprise the output from the circuit of FIG. 2 and this output is available between the terminal $h$ and ground.

Referring now to FIG. 3, waveforms A to H inclusive, are shown, these waveforms being present at the points and terminals of FIG. 2 designated by the corresponding lower case letters $a$ to $h$ inclusive. In order for the circuit of FIG. 2 to operate properly the square wave A and the triangular wave B must be synchronized with each other. This may be achieved, for example, by starting with the rectangular wave A and integrating it to produce the triangular wave B in a suitable integrating circuit, not shown, and well known to those skilled in the art.

The circuit operates in the following manner. With the triangular wave B of FIG. 3 applied to the input terminal $b$ of FIGS. 1 and 2, the rectifier circuit 10 will operate to convert this wave to the triangular rectified wave C having a frequency double that of the wave B. This rectified wave C exists at the point $c$ from which it is fed to the inverter 18 in which it is inverted to produce the wave D. The D.C. reference level of the wave D is also shifted in the circuit of the inverter 18 by means of the potentiometer 116 by setting this potentiometer so that the D.C. reference lever line just touches the upper apices of the wave D. Thus, the inverter 18 produces an inverted double frequency wave D at its output which is inverted and also shifted with respect to the D.C. level of the wave C. The inverted triangular wave D is then acted upon by the clamping circuit 22 which modifies this wave to form the wave E. The wave E is produced as a result of the transistor 128 becoming conductive during the time intervals $t_0$–$t_1$, $t_3$–$t_5$, $t_7$–$t_9$, etc., in response to the square wave A. During these time intervals, i.e., during the negative portions of the square wave A, it will be appreciated that when the transistor 128 conducts, the point e will be clamped at ground potential and therefore alternate cycles of the double frequency inverted triangular wave D will be cut out, i.e. reduced to a level of zero, as shown by the wave E. During the positive halves of the square wave A, however, the transistor 128 does not conduct and thus during the time intervals $t_1-t_3$, $t_5-t_7$, etc., the alternate cycles of the wave D appear at the point e, as shown by the wave E.

FIG. 3 also shows the waves F and G which do not exist at any particular connection point of the circuit of FIG. 2, however they are shown and discussed herein for purposes of explanation. The wave F represents the wave which is obtained by combining the double frequency rectified wave C with the wave E in the summing circuit 20. Thus the wave F as seen in FIG. 3 will be produced when the peak level of the wave E is twice the value of peak to peak level of the wave C. For purposes of explanation however it may also be considered that the resultant wave F is produced by the combination of the wave C with the wave D as the wave D is modified by the clamping circuit 22. The wave G represents the result of shifting the D.C. reference level of the wave F by means of varying the setting of the potentiometer 180.

The inverter 24 inverts the wave which is produced as a result of the summing or combining action of the summing circuit 20 to produce the output wave H at the terminal h. It will be seen that the output triangular wave H has a 90° lagging phase relationship with the input triangular wave B. It should be noted that the invention can also be practiced without the use of the last inverter 24, in which case there would still be a phase quadrature relationship between the input and output waves B and H, however, under this condition the output wave H would lead the input wave B by 90°.

Figure 4B:
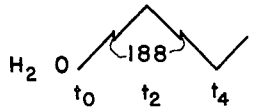
Figure 4A:
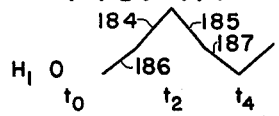

As a practical matter the slopes of the individual component waves C and E which comprise the output wave H, may not necessarily match, i.e. they will not necessarily have the same slope, see FIG. 4A. Accordingly, the slider of the potentiometer 90 must be adjusted when viewing the output wave $H_1$ on an oscilloscope in order to insure that the slopes of the component portions of the wave $H_1$, as indicated by the numerals 184 and 185, will match the slope portions 186 and 187 respectively, so that the output wave H will appear as shown in FIG. 3.

Additionally, it may be that the slopes of the component waves C and E will match in the output wave, but that there will be a discontinuity at the points 188 where the waves C and E come together, as shown by the wave $H_2$ in FIG. 4B. If this condition exists proper wave form matching can be achieved by varying the slider of the potentiometer 116 until proper matching is produced, as seen by the wave H of FIG. 3.

FIG. 5 shows a further embodiment of the invention, partly in block form and partly in the form of a schematic wiring diagram. In this figure like numerals and letters indicate like parts and circuit points as indicated in FIGS. 1 and 2. The circuit of FIG. 5 may be considered a two-channel circuit, each channel including a rectifier circuit, a clamping circuit and a summation circuit for producing a triangular wave output displaced in phase from the triangular input wave. The first channel includes a rectifier circuit having a pair of diodes 14' and 16' in combination with an inverter 12', this combination being identical with the rectifier circuit 10 of FIGS. 1 and 2. The second channel rectifier circuit shares the inverter 12' and further includes diodes 189 and 190. The rectified output waves from the first and second channel rectifier circuits appear at the points $c_1'$ and $c_2'$, respectively. The waves at these points are fed respectively to first and second channel summing circuits which combine the waves therein to form a signal wave output at the terminal h'. The first channel summing circuit includes resistors 191 and 192 and the second channel summing circuit includes resistors 193 and 194.

The first channel further includes a clamping circuit comprising a transistor 196, preferably of the NPN type, having its collector electrode 198 connected to the point $d_1'$ of the first channel summing circuit. The base electrode 200 of the transistor 196 is connected through a resistor 202 to a square wave input terminal a'. The second channel clamping circuit includes a transistor 204, preferably of the PNP type, having a collector electrode 206 which is connected to the point $d_2'$ of the second channel summing circuit. The base electrode 208 is also connected, through a resistor 210, to the square wave input terminal a'. The emitter electrodes 212 and 214 of the resistors 196 and 204, respectively, are connected to chassis ground. A terminal 216 is provided for receiving a positive potential and a resistor 218 is connected between this terminal and the collector of transistor 196. A terminal 220 is provided for receiving a source of negative potential and a resistor 222 is connected between this terminal and the collector of transistor 204. The chassis ground has a potential value intermediate that of the positive and negative terminals 216 and 220.

The operation of the circuit of FIG. 5 will now be described with the aid of the wave forms shown in FIG. 6. With an input triangular wave B' applied to the input terminal b', a rectified double frequency triangular wave $C_1'$ will appear at the first channel point $c_1'$ and a similar wave will appear at the second channel point $c_2'$; the waves $C_1'$ and $C_2'$ however are out of phase with each other, as clearly shown in FIG. 6.

The double frequency triangular wave $C_1'$ is then modified by the first channel clamping circuit transistor 196, which acts upon this wave to produce the wave $D_1'$ at the point $d_1'$. It will be seen that the wave $D_1'$ is produced as a result of the clamping action of the transistor 196 which conducts during the positive portions of the square wave A' to produce the wave $D_1'$ by cutting out the portions of this wave which would otherwise appear during the time intervals $t_1-t_3$, $t_5-t_7$, etc. The D.C. reference level of the wave $D_1'$ is also shifted by the first channel clamping circuit by an amount equal to its peak to peak value. In similar manner the form of the double frequency rectified triangular wave $C_2'$ is modified and its D.C. reference level is shifted by the second channel clamping circuit transistor 204 to produce the wave $D_2'$ at the point $d_2'$. From a comparison of the waves $D_1'$ and $D_2'$ it will be seen that the second channel transistor 204 conducts during the negative portions of the square wave A' which causes the removal of the wave portions of wave $D_2'$ which would otherwise appear during the time intervals $t_0-t_1$, $t_3-t_5$, etc. Thus it will be seen that the first channel transistor 196 and the second channel transistor 204 conduct alternately in response to the square wave A' applied to the terminal a' to produce the waves $D_1'$ and $D_2'$, each wave having a value of zero during the time intervals that a triangular wave cycle exists in the other wave. These waves $D_1'$ and $D_2'$ are component waves of the final wave produced and are combined by the first and second channel summing resistors 191, 192, 193 and 194, to produce the output triangular wave H' at the terminal h'. This output wave is 90° out of phase with the triangular input wave B' as can be seen from FIG. 6. It will be appreciated that the circuit of FIG. 5 is simpler and less expensive than the circuit of FIGS. 1 and 2.

It will be apparent that the circuits described above result in a number of important advantages not found in prior art circuit arrangements for producing two sine waves in phase quadrature relationship. As already explained, the triangular waves referred to above are easily converted by means well known in the art to sine waves in phase quadrature relationship. When so converted the overall circuit eliminates the need for ganged arrangements which require a potentiometer to gradually compensate for loss of signal level as the frequency of operation is increased. Additionally the drift problem inherent in prior arrangements is entirely eliminated by the use of circuits constructed in accordance with the teaching of the invention. In addition to these important advantages it will be apparent that the invention provides the additional advantage of simpler and less complex circuiting, fewer manufacturing and servicing problems and lower manufacturing and servicing costs.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A circuit for providing an output signal wave having a predetermined out of phase relationship with an input signal wave applied to said circuit comprising
    means for rectifying said input wave,
    means coupled to the output of said rectifying means for clamping the output thereof at predetermined intervals in a first signal path between the output of said rectifying means and an output terminal, said means for clamping being responsive to a wave applied thereto which is synchronized with said input wave,
    and means for combining said clamped output with a signal wave from said rectifying means in a second signal path between the output of said rectifying means and said output terminal, whereby an output wave having a shape similar to said input wave is provided at said output terminal.

2. A circuit for providing an output signal wave having a predetermined out of phase relationship with an input signal wave applied to said circuit comprising
    means for rectifying said input wave to thereby form a first intermediate wave,
    means for inverting said first intermediate wave to thereby form a second intermediate wave,
    means for removing alternate cycles of said second intermediate wave to thereby form a third intermediate wave,
    and means for combining said first and third intermediate waves, whereby an output wave is provided having a shape similar to said input wave.

3. The invention described in claim 2 which further includes wave inversion means connected to said combining means for inverting said output wave.

4. A circuit for providing an output signal wave having a predetermined out of phase relationship with an input signal wave applied to said circuit comprising,
    a first signal channel and a second signal channel each connected to an input terminal for receiving said input wave,
    means in each of said channels for rectifying said input wave, the rectified wave in said first channel being in phase opposition with the rectified wave in said second channel,
    means in each of said channels for combining said rectified waves into a single output wave,
    and means in each channel for removing predetermined portions of the rectified wave in that particular channel as it is being combined, whereby an output wave is provided at the output of said combining means having a shape similar to said input wave.

5. An arrangement for providing a triangular output wave having a predetermined out of phase relationship with a triangular input wave comprising a rectifier circuit for receiving said input wave from an input terminal and for delivering a rectified wave at the output of said circuit,
   a first inverter circuit coupled to the output of said rectifier circuit for inverting said rectified wave,
   means in said first inverter circuit for shifting the D.C. reference level of the inverted wave,
   a summing circuit coupled to the output of said first inverter circuit and also to the output of said rectifier circuit for summing signal waves therefrom,
   a clamping circuit coupled to said summing circuit and also adapted to receive a rectangular wave which is in synchronism with said triangular input wave, said clamping circuit being responsive to said rectangular wave to modify the wave from said first inverter circuit as it is being summed,
   and a second wave inverter circuit coupled to the output of said summing circuit, whereby said triangular output wave is provided at the output of said second inverter circuit.

6. The invention described in claim 5 wherein said rectifier circuit includes a two leg circuit, one of said legs including a diode connected between said input terminal and the output of said rectifier circuit and the other of said legs comprising a third inverter circuit connected in series with another diode between said input terminal and the output of said rectifier circuit.

7. The invention described in claim 6 wherein each of said inverter circuits is of the D.C. amplifier type.

8. An arrangement for producing a triangular output wave having a predetermined phase relationship with a triangular input wave comprising
    a first signal wave channel and a second signal wave channel each connected to an input terminal for receiving said input wave,
    a rectifier circuit in each of said channels for rectifying said input wave, the rectified waves in said first channel being in phase opposition with the rectified wave in said second channel,
    a summing circuit in each of said channels for combining said rectified waves into a single output wave,
    a clamping circuit in each of said channels coupled to the summing circuit in the channel with which said clamping circuit is associated, said clamping circuits each being adapted to receive a rectangular wave which is synchronized with said triangular input wave,
    the clamping circuit in one of said channels being operative in response to the positive halves of said rectangular wave to reduce predetermined portions of said rectified wave in said one channel to a value of zero as it is being combined, the clamping circuit in the other of said channels being operative in response to the negative halves of said rectangular wave to reduce predetermined portions of said rectified wave in said other channel to a value of zero as it is being combined,
    and means associated with each of said clamping circuits for shifting the D.C. levels of the waves associated therewith, whereby said triangular output wave is produced at the output of said summing circuit in phase quadrature relationship with said triangular input wave.

9. The invention described in claim 8 wherein said rectifier circuit in each channel includes a pair of rectifiers in combination with a wave inverter, said wave inverter being common to both of said channels.

No references cited.

ARTHUR GAUSS, *Primary Examiner.*

S. D. MILLER *Assistant Examiner.*